United States Patent [19]

Kuder et al.

[11] Patent Number: 5,472,641
[45] Date of Patent: Dec. 5, 1995

[54] SINGLE PHASE AQUEOUS PAINT REMOVER COMPOSITIONS INCLUDING TRIOXANE, WATER AND AN ORGANIC CO-SOLVENT

[75] Inventors: James E. Kuder, Fanwood; Larry F. Charbonneau, Mendham; Elizabeth E. Fernekess, Basking Ridge, all of N.J.

[73] Assignee: Hoechst Celanese Corp., Somerville, N.J.

[21] Appl. No.: 255,619

[22] Filed: Jun. 9, 1994

[51] Int. Cl.⁶ .............................. C09D 9/00; C11D 7/26; C11D 7/32; C11D 7/50
[52] U.S. Cl. .............................. 252/542; 134/38; 252/153; 252/171; 252/173; 252/174.17; 252/174.23; 252/DIG. 8
[58] Field of Search .................................... 252/542, 153, 252/162, 170, 171, 173, 174.17, 174.23, DIG. 8; 134/38

[56] References Cited

U.S. PATENT DOCUMENTS

| | | | |
|---|---|---|---|
| 4,830,772 | 5/1989 | Van De Mark | 252/170 |
| 4,956,115 | 9/1990 | Van De Mark | 252/170 |
| 4,973,420 | 11/1990 | Van De Mark | 252/170 |
| 5,076,954 | 12/1991 | Loth et al. | 252/122 |
| 5,175,309 | 12/1992 | Tsumura et al. | 548/548 |

FOREIGN PATENT DOCUMENTS

| | | |
|---|---|---|
| 2118870 | 10/1972 | Germany . |
| 2123563 | 11/1972 | Germany . |
| 57-23074 | 2/1982 | Japan .................................... 252/170 |
| 58-82243 | 5/1983 | Japan . |

OTHER PUBLICATIONS

L. Scheflan et al, *The Handbook of Solvents*, D. Van Nostrand Co., Inc. N.Y. 1953 pp. 500–501.

Mellan, I., *Industrial Solvents Handbook*, Noyes Data Corp., N.J. 1977 pp. 335, 476–478.

Chemical Abstracts Registry No. 9004–62–0. Copyright 1995.

"EPA Master List of Paint Stripper Solvents" (no date provided).

*Chemical Economics Handbook—SRI International*, selected pages Mar. 1992.

*Specialty Chemicals—SRI International*, pp. 80–81, Oct. 1992.

Primary Examiner—Linda Skaling Therkorn
Attorney, Agent, or Firm—Michael W. Ferreu

[57] ABSTRACT

A paint remover composition consisting essentially of a single phase mixture of water, trioxane and an organic co-solvent having a flash paint above about 80° C. is disclosed and claimed. Particularly preferred co-solvents are gamma-butyrolactone and N-methyl pyrrolidone.

14 Claims, No Drawings

SINGLE PHASE AQUEOUS PAINT REMOVER COMPOSITIONS INCLUDING TRIOXANE, WATER AND AN ORGANIC CO-SOLVENT

TECHNICAL FIELD

The present invention relates generally to paint remover compositions and in specific embodiments to single phase aqueous paint remover compositions containing trioxane, water and a co-solvent selected from the group consisting of gamma-butyrolactone, N-methyl pyrrolidone and mixtures thereof.

BACKGROUND

Paint removers or strippers are well known in the art. One class is based on methylene chloride, usually consisting of 60–80% methylene chloride along with methanol, surfactants, emulsifiers and alkaline or acid activators. Toxic concerns have led to the requirement that these strippers carry warning labels. Some industrial users are believed to be using strippers based on N-methyl pyrrolidone (NMP) which are inherently much more expensive than methylene chloride-based strippers and reportedly not as effective. So also, it may be desirable to limit usage of NMP since it has recently been implicated as potentially causing reproductive damage.

Yet other classes of paint strippers are based on aromatic hydrocarbons, methanol, toluene, acetone, alkali and the like.

In general, it is desirable that a paint remover have a relatively high flash point (low flammability) and not be subject to photochemical decomposition or excessive fuming. Moreover, vapors, especially toxic vapors, are particularly problematical. The 3M Corporation has begun to sell "Safest Stripper" which is believed to be based on dimethyl adipate and is claimed to be non-toxic. It is reported, however, that this product is slow-acting and has accordingly produced a negative reaction from consumers. Still other strippers, such as caustic soda based compositions require relatively high temperatures to be effective and are thus unsuitable for many applications.

With concerns for abatement of lead paint-related environmental problems, the search for paint removers with low flammability and low toxicity as well as relatively high effectiveness continues.

Trioxane-containing paint strippers have been suggested, notably in U.S. Pat. Nos. 4,956,115; 4,973,420 and 4,830,772. The '420 and '772 patents disclose compositions which appear to have relatively low flash points, while the '115 patent discloses multi-phase emulsions in water where preparation and stability may be a problem.

SUMMARY OF INVENTION

It has been found in accordance with the present invention that aqueous trioxane compositions without a high concentration of emulsion-forming surfactant are surprisingly effective in removing a wide variety of paints and coatings. In general, compositions of the present invention consist essentially of water, an organic co-solvent with a flash point above about 80° C. and trioxane. Preferred are compositions of trioxane, gamma-butyrolactone or NMP and water which components are mutually miscible and form a single stable phase. Gamma-butyrolactone is especially preferred. Optionally included is a thickening agent.

DETAILED DESCRIPTION

The invention is described in detail below with reference to numerous specific embodiments which are provided for purposes of exemplification only. Modifications to the specific compositions hereinafter disclosed will be readily apparent to those of skill in the art within the spirit and scope of the present invention. For example, the precise ratios of the components may be varied from 1:1:1 without changing the basic and novel characteristics of the present invention.

Generally speaking, the paint stripper compositions of the present invention are single phase mixtures which include water, trioxane and an organic co-solvent having a flash point above about 80° C. Water has several advantages in such compositions, including the fact that it effectively has an infinite flash point and the fact that should any free formaldehyde form from the trioxane present, it will react with water to form methylene glycol which is non-volatile, effectively acting as a scavenging agent. Trioxane, the cyclic trimer of formaldehyde also known as 1,3,5 trioxane or trioxymethylene is a particularly suitable substance for many paint-stripper applications since it is relatively non-toxic, has a low vapor pressure and is a good solvent for coatings of paint and the like, especially when used in connection with a co-solvent such as gamma-butyrolactone.

Trioxane's vapor pressure is relatively low, 10 mm Hg at 20° C. relative to methylene chloride (353 mm at 20° C.) or acetone (184 mm at 20° C.); although not as low as NMP (0.2 mm at 20° C.). Trioxane does, however, have a solubility parameter and molecular weight similar to that of methylene chloride. Low molecular weight is generally desirable since diffusion should more readily occur with a lower molecular weight compound as opposed to a higher molecular weight compound. Preferred co-solvents include gammabutyrolactone or N-methyl pyrrolidone, as well as those solvents with flash points above about 80° C. which will cooperate with trioxane to dissolve or strip a coating. The flash point of a liquid such as the co-solvent or the inventive mixtures themselves is the lowest temperature at which the vapors of the liquid decompose to a flammable gaseous mixture. This property is measured in accordance with ASTM method number D3828-87 unless specifically noted otherwise herein.

Paint remover compositions of the present invention may in general include from about 10 to about 50 weight percent of the primary ingredients, water, trioxane, and an organic co-solvent with a flash point above about 80° C. From about 20 to 40 weight percent for these components is more typical, with from about 25 to about 35 weight percent of each being preferred; equal parts of each are especially preferred. It is also desirable that the flash point of the inventive mixture be at least about 45° C. Optionally included are thickening agents if a paste-like consistency is desired.

If a thickening agent is desired, a cellulosic thickener such as methylcellulose, hydroxypropyl methylcellulose, hydroxybutyl methylcellulose, hydroxypropyl cellulose or mixtures thereof may be employed; all of which are well known in the art. A particularly preferred thickener for trioxane based stripper compositions may be of the polyacrylamide class since these basic amides will also scavenge free formaldehyde from the mixture.

The compositions of the present invention may be prepared by any suitable means, including by way of an ordinary blender. Inasmuch as the water, organic co-solvent and trioxane have a relatively high degree of mutual solubility, it is typically sufficient to merely mix the components in a suitable container without undue agitation; such as merely placing the components into a flask and gently rotating or shaking the flask to complete the mixing or blending of the components. It may be preferred to dissolve the trioxane in the co-solvent prior to adding water; especially where trioxane is more soluble in an organic co-solvent such as gamma-butyrolactone.

Series I

Four types of test substrates were prepared by coating a thin film onto a microscope slide with a six rail doctor blade as indicated in Table 1:

TABLE 1

Test Substrates

| Type | Material | Brand Information |
|---|---|---|
| 1 | Acrylic Latex Paint | Murolo Exterior/Interior High Gloss White Enamel |
| 2 | Polyurethane Enamel | Murolo Exterior/Interior High Gloss White Enamel |
| 3 | Alkyd Varnish | Bertley Clear Varnish (Polyurethane, Alkyd) |
| 4 | Polyurethane | Miniwax Fast Drying Polyurethane |

The substrates so prepared were treated with stripper compositions commercially available and as prepared by blending the components indicated in Table 2. Table 2 also shows the relative effectiveness of the various compositions upon the various coatings.

TABLE 2

SERIES I PAINT STRIPPER RESULTS

| Stripper Composition | Substrate Type | | | |
|---|---|---|---|---|
| | 1 | 2 | 3 | 4 |
| 5f5, available from Sterling-Clark Lurton Corp. MeCl$_2$, MEOH, toluene | lifts in 10 seconds | lifts in 19 seconds | lifts in 14 seconds | lifts in 30 seconds |
| Zip Strip 2, available from Star Bronze Co. Zip Strip 2 is believed to contain 19.7 percent by weight ethyl 3-ethoxy-prionate and 39.2 weight percent gamma-butyrolactone | wipe off after 10 minutes | wipe off after 10 minutes | wipe off after 10 minutes | lifts in 270 seconds |
| Safest Stripper available from 3M believed to be diester-based | wipe off after 10 minutes | wipe off after 10 minutes | not wipe off after 10 minutes | wipe off after 10 minutes |
| trioxane, methanol toluene (equal weights) | lifts in 26 seconds | lifts in 87 seconds | lifts in 45 seconds | lifts in 55 seconds |
| trioxane, water, gamma-butyrolactone (equal weights) | wipe off after 1 minute | wipe off after 10 minutes | wipe off after 5 minutes | wipe off after 10 minutes |

In the foregoing table, "lifts off" indicates bubbling at the treatment time indicated, while a "wipe off" entry indicates the coating was only loosely adhered after the treatment time indicated. The only case in this series where substantial loosening of the coating did not occur in 10 minutes was with Safest Stripper® paint remover in the case of the alkyd/polyurethane varnish.

SERIES II

Following the procedure of Series I, a second group of coated microscope slides were prepared and tested with various stripper compositions as indicated in Table 3 below. The proportions indicated in the first column are by weight.

TABLE 3

SERIES II PAINT STRIPPER RESULTS

| Stripper Composition | Polyurethane High Gloss Enamel | Acrylic Latex High Gloss Enamel |
|---|---|---|
| NMP-based commercial | loosens in 1 minute, lifts in 2 minutes | loosens in 15–30 seconds lifts in 1–2 minutes |
| Methylene chloride based commercial | lifts in 20–30 seconds | lifts in 20 seconds |
| Gamma-butyrolactone (Neat) | loosens in 3 minutes | loosens in 7 minutes |
| Gamma-butyrolactone trioxane (1:1) | loosens in 6 minutes | loosens in 8–10 minutes |
| Gamma-butyrolactone trioxane (2:1) | loosens in 6 minutes | loosens in 8–10 minutes |
| Gamma-butyrolactone water, trioxane 1:1:1 | loosens in 2 minutes | loosens in 1 minute |

The terminology "lifts" or "loosens" in Table 3 are as indicated hereinabove in connection with Series I.

As may be seen from Table 3, the inventive composition of the last entry is substantially more effective as a paint stripper than mixtures of gamma-butyrolactone and trioxane or gamma-butyrolactone alone. This is believed to be an unexpected property, that is, where water significantly enhances the effectiveness of the other components of the stripper composition. The water/trioxane/gamma-butyrolactone composition has a flash point of approximately 122° F. or about 50° C.

SERIES III

In this series paint strippers of the present invention were compared with commercial methylene chloride and NMP-based paint for effectiveness on wood substrates. The aqueous trioxane/co-solvent compositions of the present invention were found comparable to the commercial NMP-based compositions.

Substrate Preparation 1 square foot pine boards were coated with clear gloss polyurethane cut with five (5) parts mineral spirits as a sealant. After drying, the boards were coated with first and second coatings of polyurethane enamel (see Series I), with twenty-four hours (24h) of drying time between coats. After 2 days of drying at room temperature, the boards were cured for 10 days at 70° C. in an oven. The relative effectiveness of two commercially available paint strippers and that of the present invention on these coatings are illustrated below in Table 4.

TABLE 4

| Stripper Composition | Effect on Series III Substrate |
| --- | --- |
| Commercially available methylene chloride composition (f5f) | lifts in 5 minutes |
| Commercially available NMP composition (Wood Finisher's Pride) | after 30 minutes paint scraped away moderately easy |
| Gamma-butyrolactone trioxane water (equal parts by weight) | after 30 minutes about the same as commercial NMP composition above |

Series III Results

Series IV

Following generally the procedure of Series III, a fourth series of experiments were conducted to explore the ability of various mixtures to form a single phase mixture and remain effective as a paint stripper. By the terminology "single phase mixture" it is meant that the various components form a homogeneous solution, as is visually observable, at the proportions indicated. Results appear in Table 5 below.

TABLE 5

Series IV Results

| Stripper Composition | Flash Point of Co-Solvent | Single Phase | Stripping Effectiveness at 30 minutes |
| --- | --- | --- | --- |
| water/trioxane/ NMP 1:0.8:1 | 85° C. | yes | yes |
| water/trioxane/ dipropylene glycol monomethyl ether acetate 1:1:1 | 83° C. | no | — |
| water/trioxone/ gamma-butyrolactone 1:1:1 | 98° C. | yes | yes |
| water/trioxane/ propylene carbonate 1:1:1 | 132° C. | no | — |
| water/trioxane/ propylene glycol 1:0.2:1 | 107° C. | yes | no |

In the first and last entries of Table 5, the concentration of trioxane was reduced due to the solubility of trioxane in the mixture.

The invention, having been thoroughly described and exemplified is further defined in the appended claims.

We claim:

1. A single phase mixture effective as a paint stripper consisting essentially of from about 20 about 40 weight percent water, from about 20 to about 40 weight percent of an organic co-solvent selected from the group consisting of gamma-butyrolactone, N-methyl pyrrolidone and mixtures thereof, from about 20 to about 40 weight percent trioxane and optionally including a thickening agent.

2. The mixture according to claim 1, wherein said mixture has a flash point of 45° C. or higher.

3. The mixture according to claim 1, wherein water is present from about 25 to about 35 weight percent.

4. The mixture according to claim 1, wherein said organic co-solvent is present from about 25 to about 35 weight percent.

5. The mixture according to claim 1 wherein said trioxane is present from about 25 to about 35 weight percent.

6. The mixture according to claim 1 wherein said organic co-solvent is gamma-butyrolactone.

7. The mixture according to claim 1 wherein said organic co-solvent is N-methyl pyrrolidone.

8. The mixture according to claim 1, including a cellulosic thickening agent.

9. The mixture according to claim 8, including a thickening agent selected from the group consisting of methylcellulose, hydroxypropyl methylcellulose, hydroxybutyl methylcellulose, hydroxypropyl cellulose and mixtures thereof.

10. The mixture according to claim 1, including a polyacrylamide thickening agent.

11. A single phase mixture effective as a paint stripper consisting essentially of from about 10 to about 50 weight percent water, from about 10 to about 50 weight percent of an organic co-solvent selected from the group consisting of gamma-butyrolactone, N-methyl pyrrolidone and mixtures thereof, from about 10 to about 50 weight percent trioxane, and a cellulosic or polyacrylamide thickening agent in an amount sufficient to obtain the consistency of a paste.

12. The mixture according to claim 11, wherein water is present from about 20 to about 40 weight percent.

13. The mixture according to claim 11, wherein said organic co-solvent is present from about 20 to about 40 weight percent.

14. The mixture according to claim 11, wherein said trioxane is present from about 20 to about 40 weight percent.

* * * * *